United States Patent [19]
Olson

[11] 3,760,934
[45] Sept. 25, 1973

[54] MOTION TRANSFER SYSTEM
[75] Inventor: Elmer E. Olson, Nashotah, Wis.
[73] Assignee: G. B. Lewis Company, Watertown, Wis.
[22] Filed: May 12, 1971
[21] Appl. No.: 142,461

Related U.S. Application Data
[63] Continuation-in-part of Ser. No. 823,763, May 12, 1969, abandoned.

[52] U.S. Cl. ............................................. 198/158
[51] Int. Cl. ........................................... B65g 17/34
[58] Field of Search ................... 198/137, 138, 158; 214/16.1 B; 312/268

[56] References Cited
UNITED STATES PATENTS
3,202,265   8/1965   Anders................................. 198/18
1,859,874   5/1932   James .............................. 198/158 X
3,084,786   4/1963   Wullschleger ...................... 198/138
3,363,958   1/1968   Antram........................... 198/158 X
3,162,299   12/1964  Wullschleger ...................... 198/158

Primary Examiner—Edward A. Sroka
Attorney—Parker, Carter & Markey

[57] ABSTRACT

A motion transfer system for conveying a carried unit, such as a shelf in a chain driven conveyor, about a curvilinear path of movement while maintaining the carried unit in a firmly gripped, fixed position with respect to a reference plane, such as the horizontal, during the linear and curvilinear movements.

27 Claims, 21 Drawing Figures

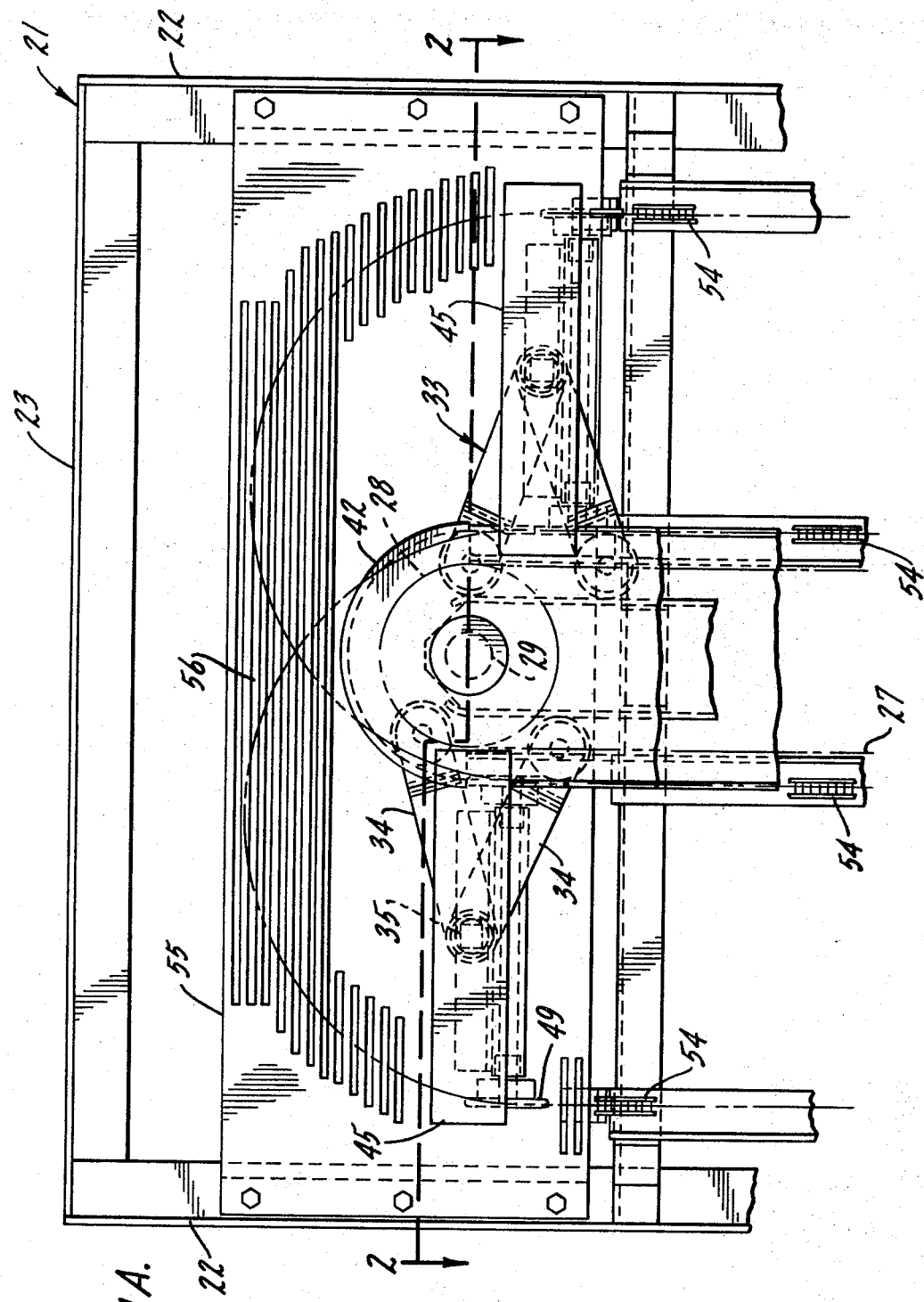

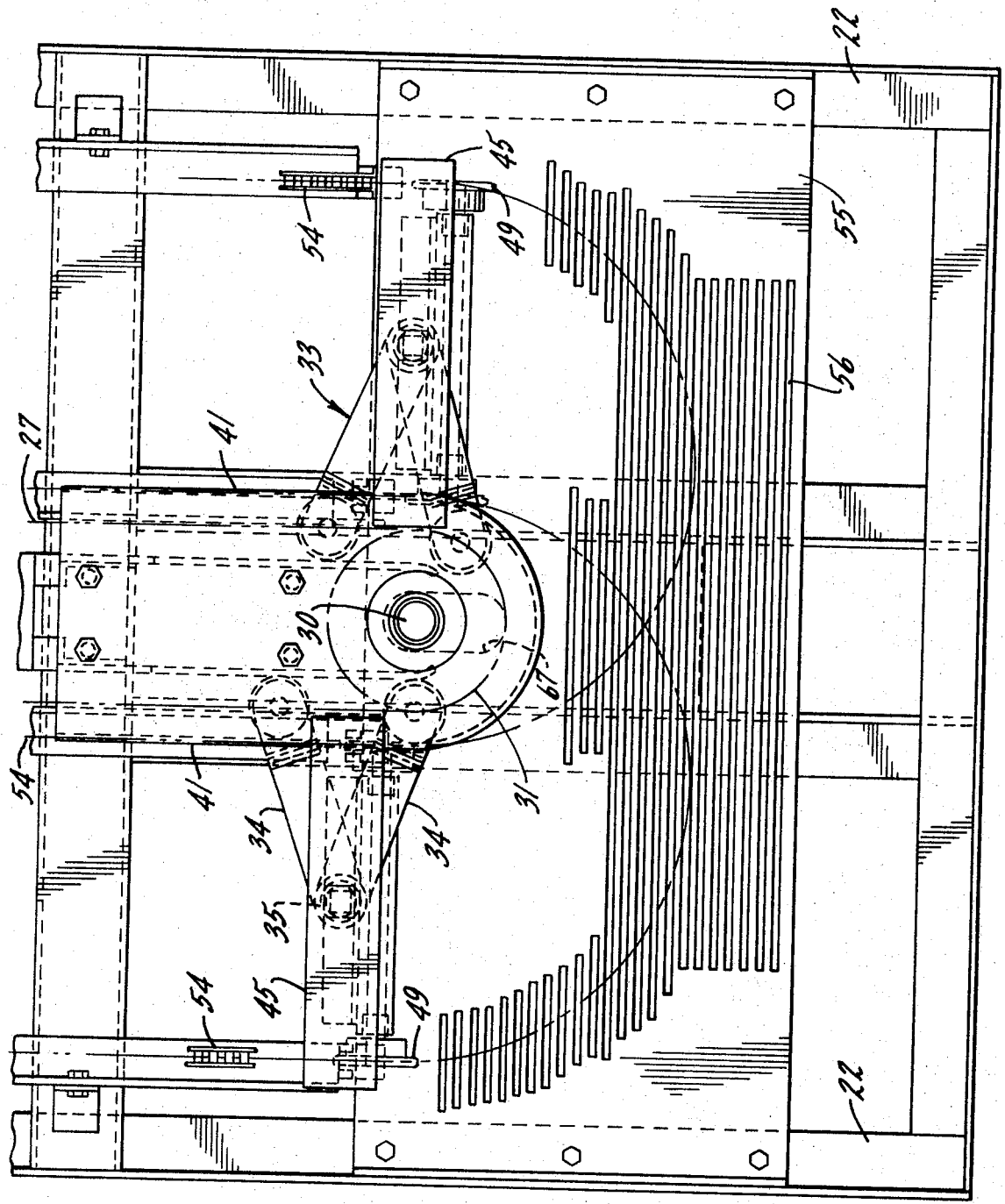

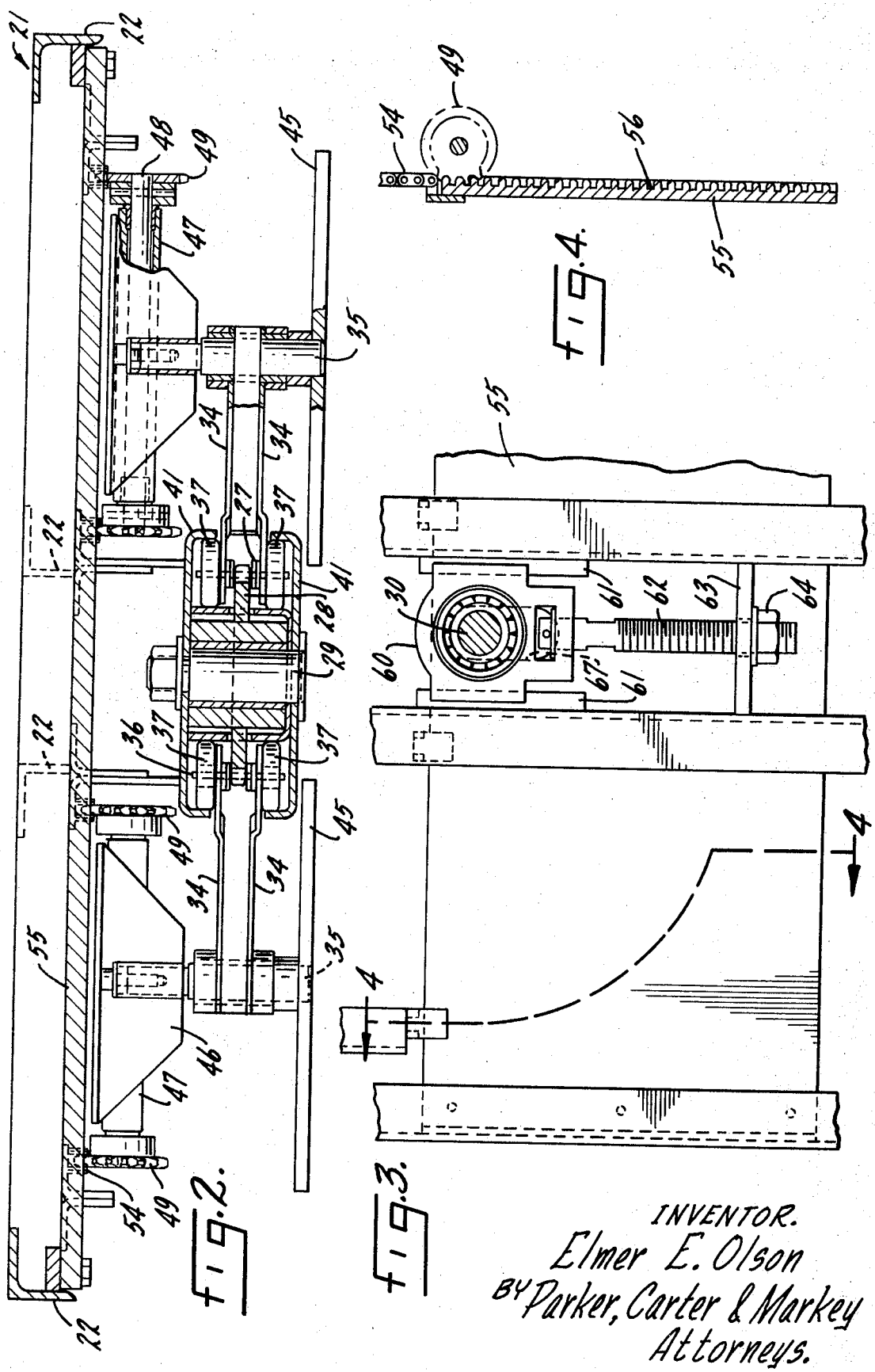

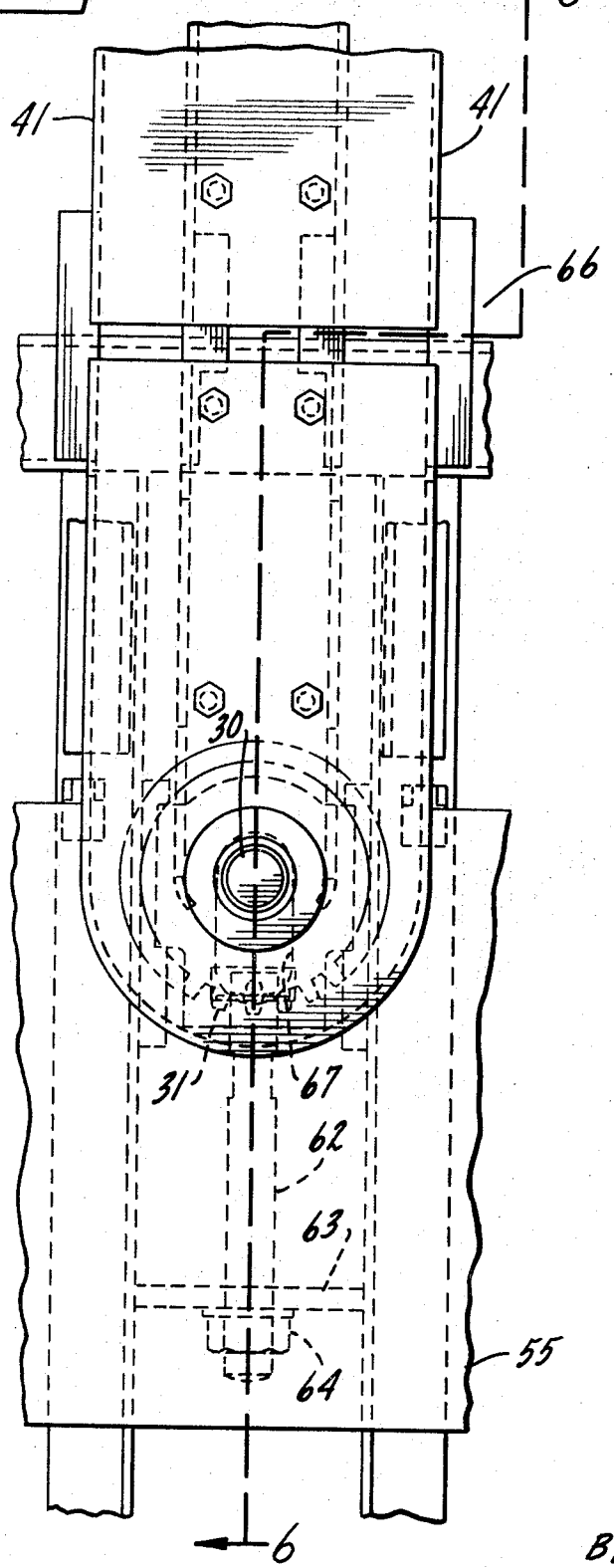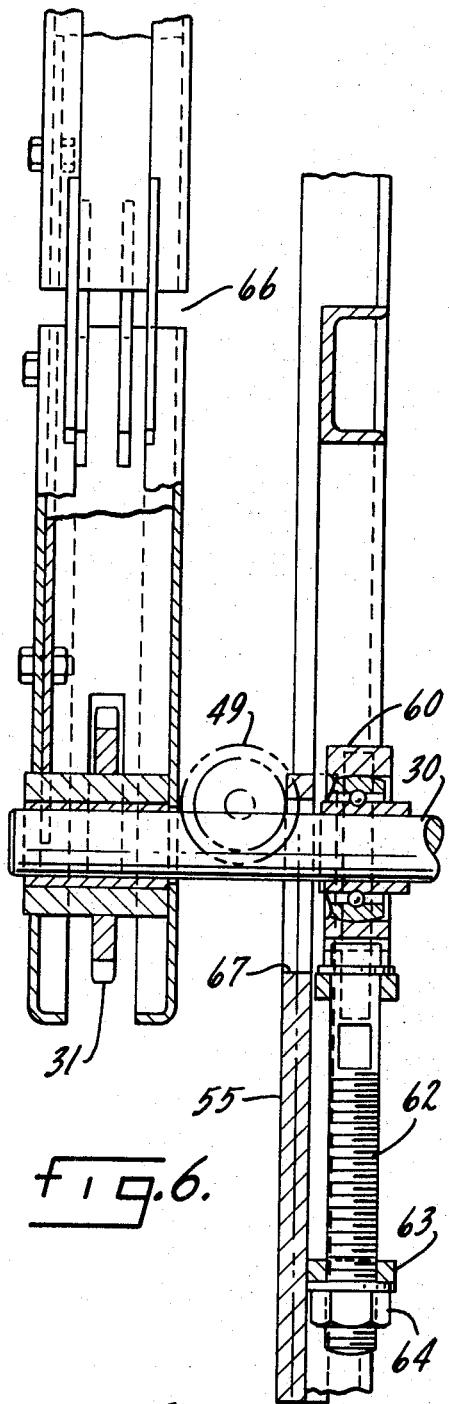

INVENTOR.
Elmer E. Olson
BY Parker, Carter & Markey
Attorneys.

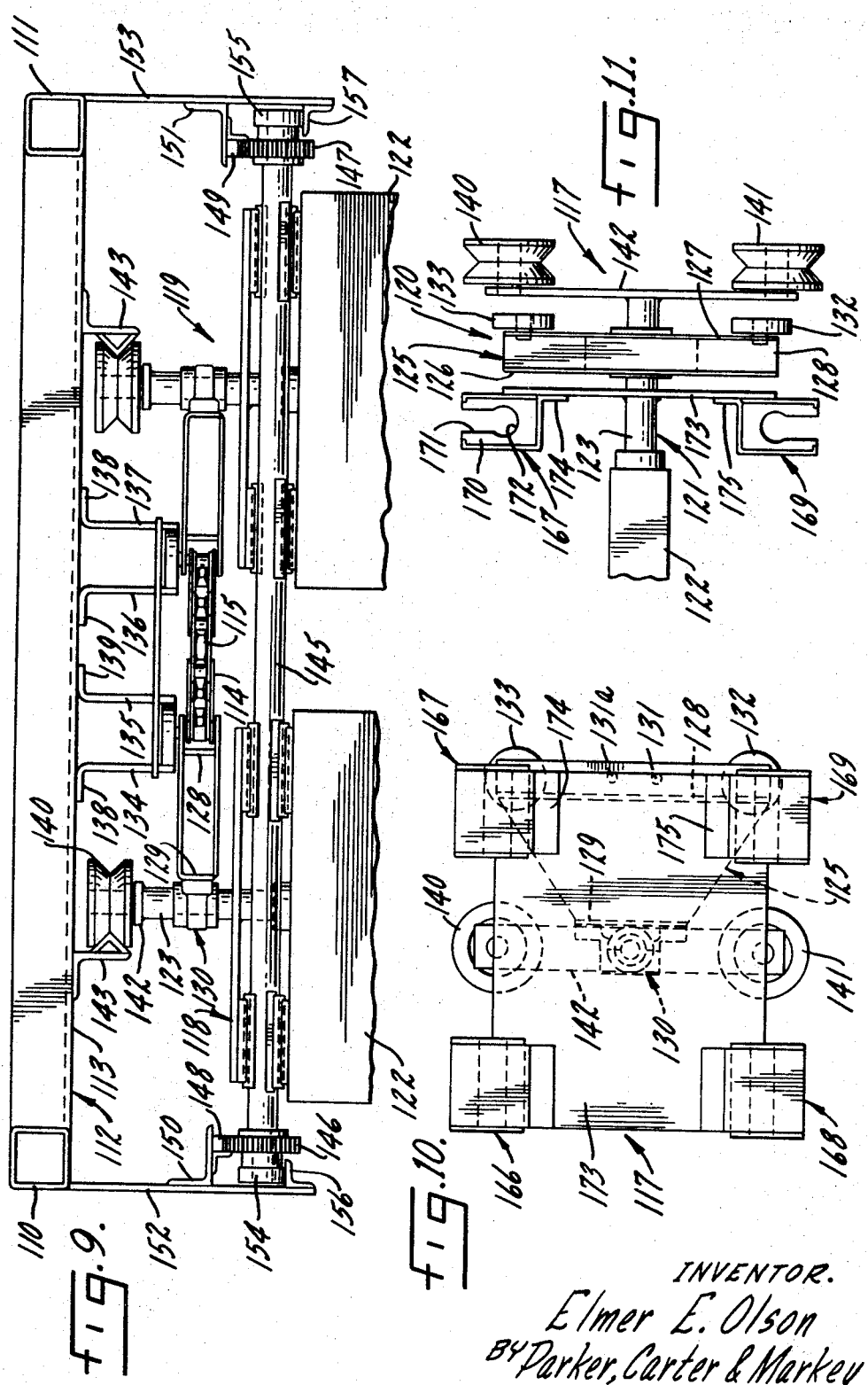

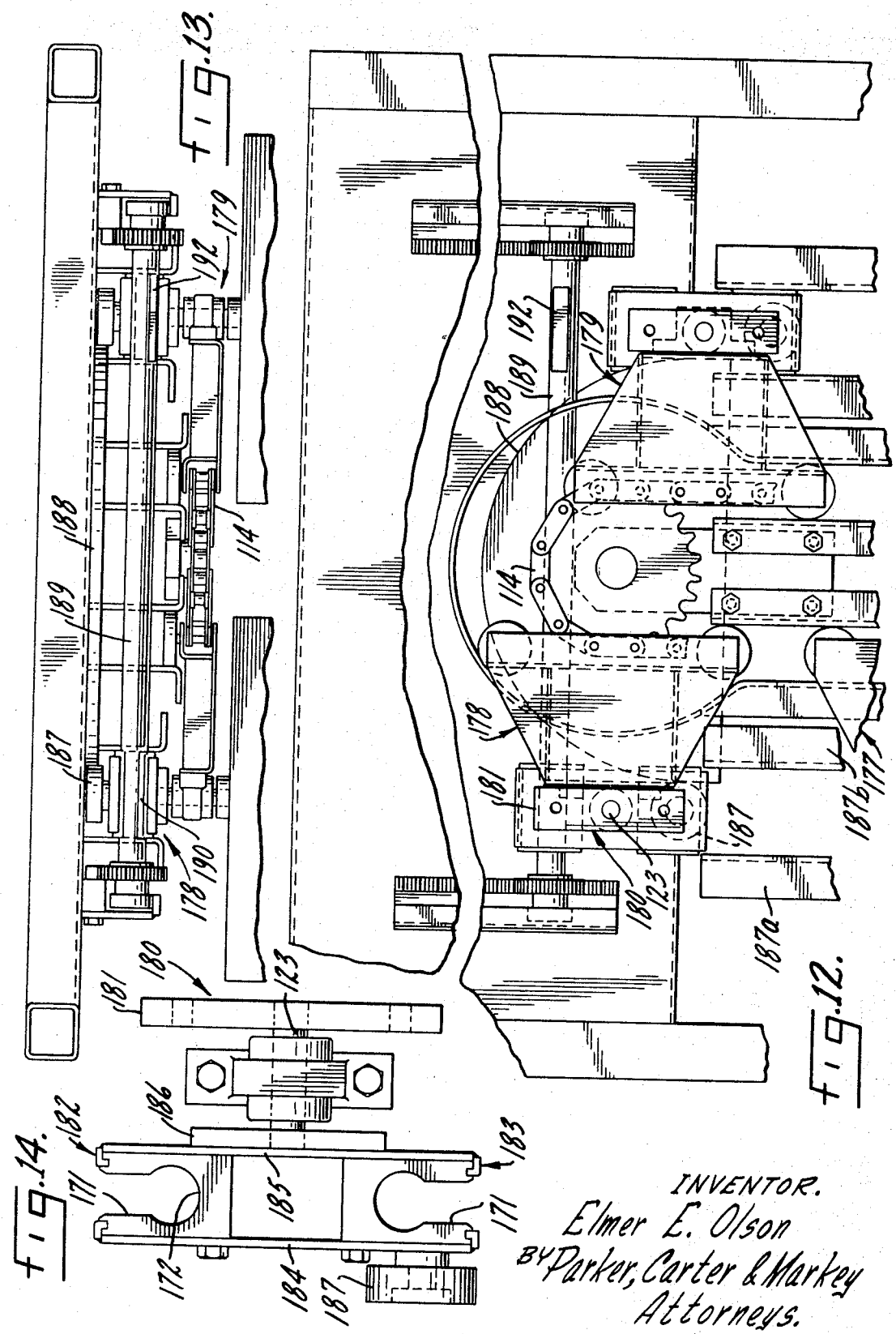

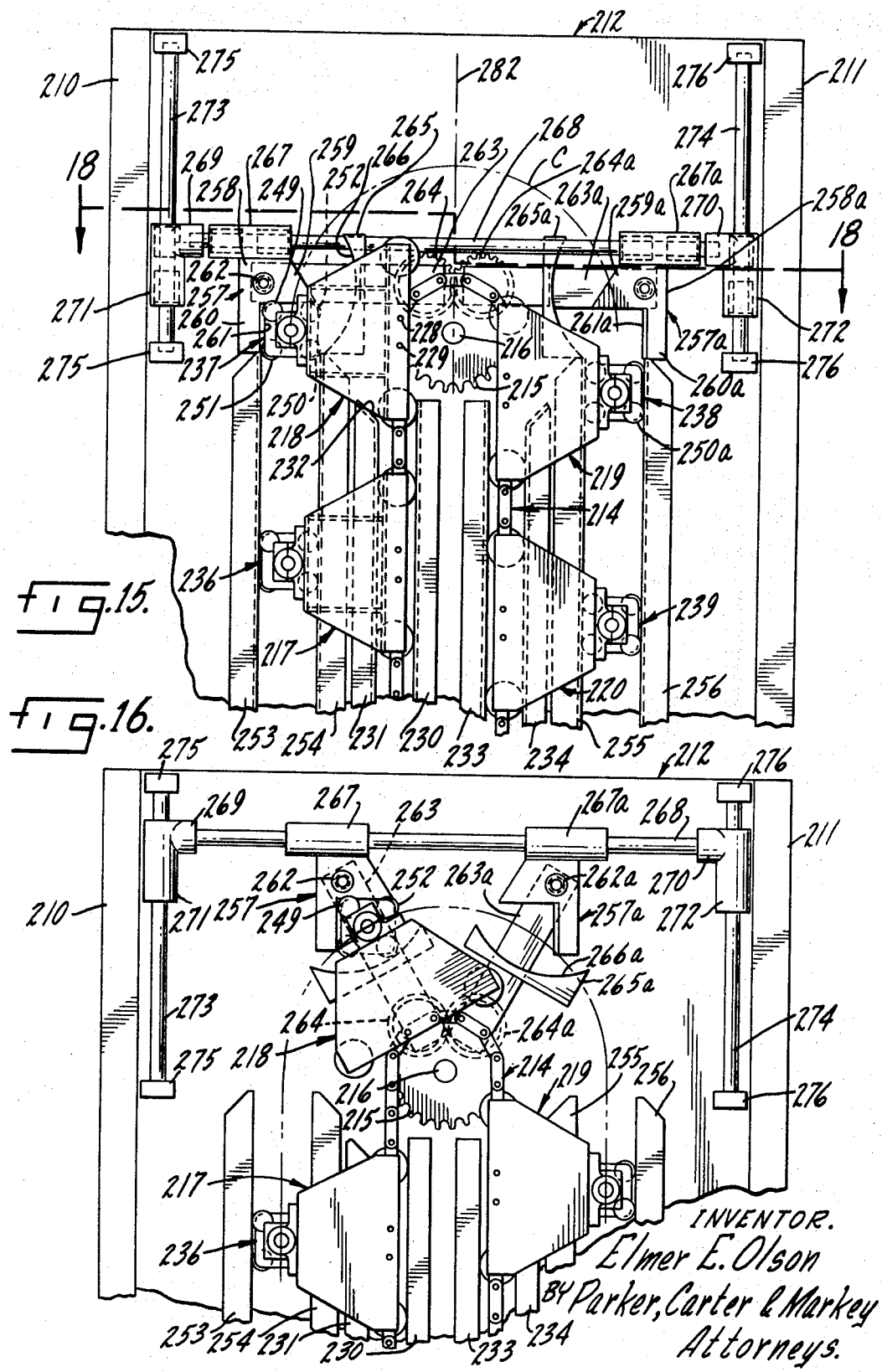

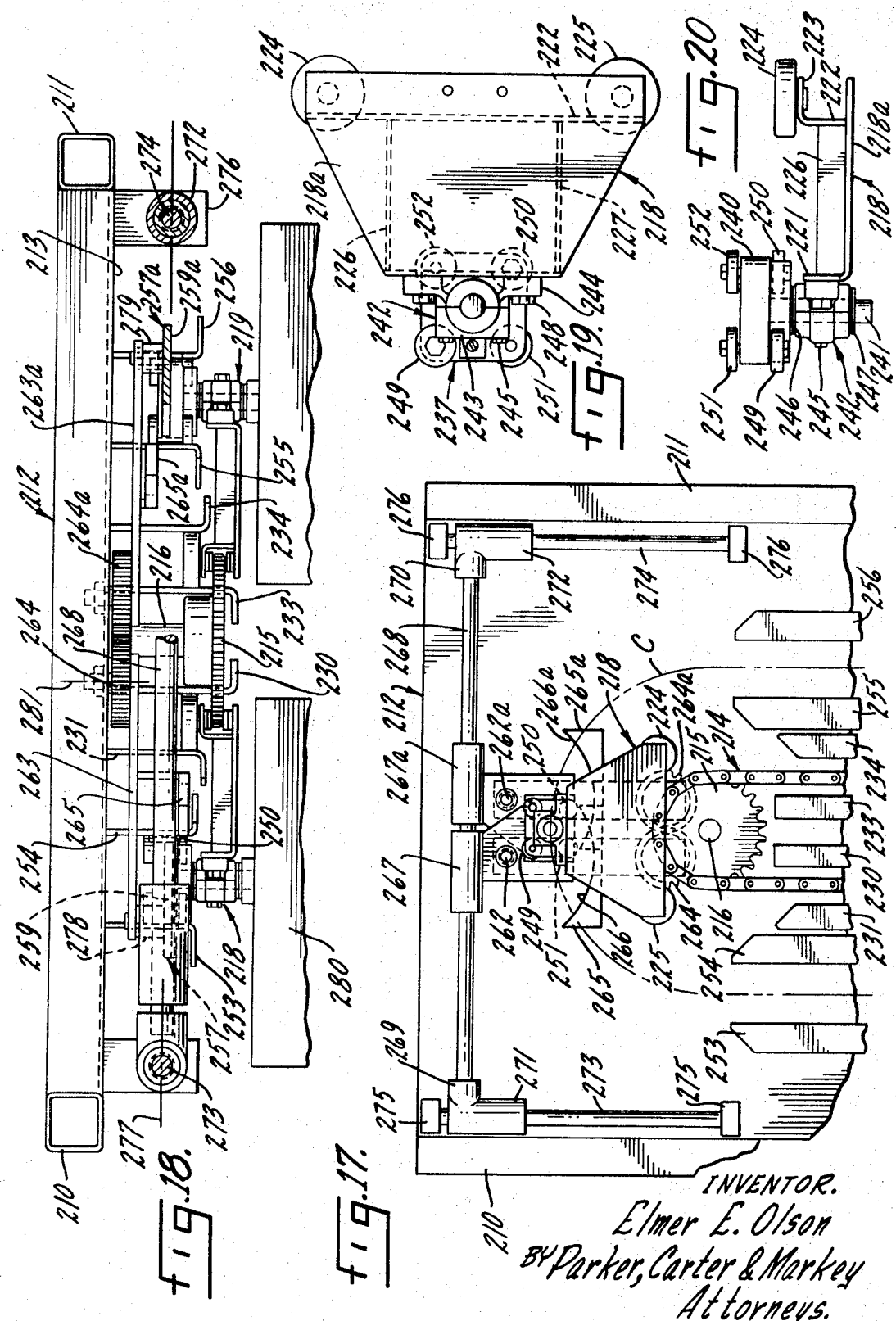

3,760,934

MOTION TRANSFER SYSTEM

This is a continuation-in-part of my application Ser. No. 823,763, filed May 12, 1969, now abandoned.

SUMMARY OF THE INVENTION

This invention relates to a stabilization system for carrier units which move along a closed, orbital path having a curvilinear portion of movement, and a motion transfer system usable therein and in other applications where smooth, positive transfer of a moving part about a curve is required. Although the invention has wide application, it will be described in connection with its use in a conveyor system of the general type illustrated in U.S. Pat. No. 3,340,995, in which a plurality of shelves are driven by a chain and drive sprocket system to a point at which a selection may be made from an appropriate shelf by a user of the machine.

An object of the invention is to provide a stabilization system for a conveyor system of the type described having positive restraining means for the carrier units during the travel of the carrier units around the curved portions of the orbital path of travel.

Another object is to provide a stabilization system for a conveyor system of the type described above which requires no direct drive tie-in between the conveyor drive and the stabilization system.

Another object is to provide a stabilization system and motion transfer system as above described which eliminates timing problems now common to systems currently in vogue.

Another object is to provide a stabilization system and a motion transfer system which is equally well adapted for use on conveyor units in which the carrier supports are connected directly to the conveyor chain or to a bar or arm extending from the chain.

Another object is a conveyor system in which the conveyor chains do not obstruct the ends of the carrier units thereby permitting the carrier units to be loaded and unloaded from the ends.

Another object is to provide a system as above described which results in more usable space per cubage since the carriers may be closer together due to an increase in speed of the carriers, though not the drive system, as the carriers move around the drive sprockets.

Another object is a conveyor system of the type described in which the tension on the conveyor chain may be adjusted.

Another object is to provide a system as above described which permits the carriers to be stopped at any point around the sprocket and then restarted in either direction with no chance of binding due to rollers being on the center of the track curves.

Another object is to provide a system as above described whereby a carrier stabilizer assembly moves with the carrier along the curvilinear portion of a path of travel, while the carrier support assembly is maintained in a fixed relationship with respect to the horizontal.

Another object is to provide a system as above described in which a carrier is firmly nested in a three-point support from the moment it begins travel along a curvilinear path until it completes its travel, and is maintained in the same position relative to the horizontal as it moves along the curvilinear path.

Other objects and advantages of the invention will be apparent from the following description.

BRIEF DESCRIPTION OF THE DRAWINGS

The invention is illustrated more or less diagrammatically in the accompanying drawings wherein:

FIG. 1A is a partial vertical side view of the top portion of one form of conveyor system embodying the novel features of this invention;

FIG. 1B is a partial vertical side view of the bottom portion of the conveyor system of FIG. 1A;

FIG. 2 is a sectional view of the conveyor system of FIG. 1 taken substantially along line 2—2 of FIG. 1A;

FIG. 3 is a partial vertical side view of the bottom portion of the conveyor of FIG. 1B;

FIG. 4 is a view taken along line 4—4 of FIG. 3;

FIG. 5 is an enlarged partial vertical detail view of a portion of the conveyor of FIG. 3 showing the conveyor chain tensioning mechanism;

FIG. 6 is a view taken along line 6—6 of FIG. 5;

FIG. 9 is a top plan view of FIG. 7;

FIG. 10 is a detail view to an enlarged scale of a carrier bracket assembly;

FIG. 11 is an end view of the carrier bracket assembly of FIG. 10;

FIG. 12 is a partial vertical side view with portions removed for clarity and others shown in dotted lines of another embodiment of the invention;

FIG. 13 is a top plan view of FIG. 12;

FIG. 14 is an end view of a carrier stabilizer block assembly utilized in the embodiment of FIGS. 12 and 13;

FIG. 15 is a partial vertical side view with portions removed for clarity and others shown in dotted lines of another embodiment of the present invention in which the parts are illustrated in one limit condition;

FIG. 16 is a vertical side view with additional portions removed for clarity illustrating the parts in a subsequent condition;

FIG. 17 is a vertical side view similar to FIG. 16 illustrating the system in a second limit condition;

FIG. 18 is a view taken substantially along the line 18—18 of FIG. 15;

FIG. 19 is a detailed view to an enlarged scale of a carrier bracket assembly; and FIG. 20 is an end view of the carrier bracket assembly of FIG. 19.

DESCRIPTION OF THE PREFERRED EMBODIMENTS

Figure 7:
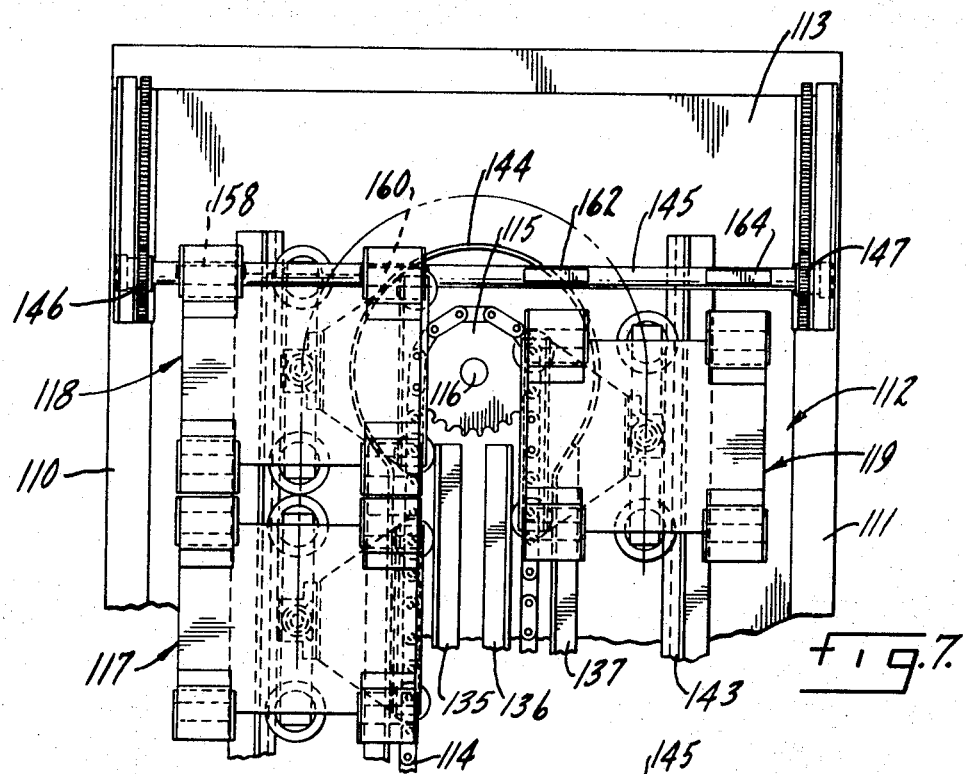
FIG. 7 is a partial vertical side view with portions removed for clarity and other shown in dotted lines of another embodiment of conveyor system of the present invention in which the parts are illustrated in one limit condition.

A first embodiment of a conveyor system constructed in accordance with the teachings of this invention is shown in FIGS. 1 through 6 of the drawings. The conveyor system includes a framework 21 consisting of spaced uprights 22. The uprights are connected across their tops by a cross member 23. Although one type of framework is shown and described, it should be understood that other suitable frameworks may be utilized depending upon the conveyor system to which the invention of this application is applied.

A conveyor drive chain 27 is mounted on an idler sprocket 28 which is received on idler shaft 29. The chain is driven by power input shaft 30 through a drive sprocket 31 as shown in FIGS. 1B and 6. Selected links of the drive chain are connected to carrier of shelf support means 33. The carriers or shelves which are attached to the support means 33 have been omitted for clarity of illustration.

The carrier support means 33 includes a pair of carrier arms 34 each of which is pivotally connected at one end to the conveyor drive chain 27 and at its opposite end to a carrier support shaft 35. The carrier arms of each pair are arranged with one arm extending upwardly and the other extending downwardly so that the arms connect to separate links of the conveyor drive chain. Each carrier arm is connected to the carrier drive chain by a pivot pin 36. Each arm is also provided with a roller 37 connected to its pivot pin and with the roller located outwardly of the drive chain 27 and the arm 34 in the manner shown in FIG. 2.

The rollers 37 ride in guides which are formed with linear portions and arcuate portions. The linear portions of the guides consist of oppositely facing channels 41 while the arcuate portions consist of semi-circular members 42. The semi-circular members 42 are located at the top and bottom of the sets of channels 41 and connect these channels to provide closed, orbital paths for the rollers 37. The rollers 37 and the guides form a stabilizing system for the carrier support arms.

Rigidly affixed to one end of the carrier support shaft 35 is a carrier bracket plate 45. A carrier or a shelf (which have been omitted for clarity of illustration) may be attached to the bracket plate 45. Rigidly attached to the opposite end of the shaft 35 is a bracket 46. This bracket is attached to a sleeve 47 which receives a shaft 48. Keyed to the opposite ends of the shaft 48 are sprockets 49. The sprockets 49 engage stationary roller chains 54 which in turn are secured to stabilizer plates 55 attached to the framework 21. Grooves 56 are cut into the stabilizer plates to receive the teeth of the sprockets 49 with the grooves aligned with the stationary roller chains. It should be observed that the grooves are quite long in comparison with the width of the stationary rollers chains 54 and are arranged to form arcs to enable the sprockets 49 to roll up and down in the grooves and also slide linearly along the grooves during arcuate transit of the carrier support means around the conveyor sprockets.

A tension adjustment mechanism for the conveyor drive chain 27 is shown in detail in FIGS. 3, 5 and 6 of the drawings. The power input shaft 30 is mounted in a bearing block 60 which is movable vertically in bearing guides 61. A threaded rod 62 is pivotally connected to the bearing block. The opposite end of the threaded rod extends through an opening in a plate 63. A nut 64 fits on the rod and engages the plate 63 to tension the bearing block 60 and conveyor chain. Slip connections are formed at 66 in the channels 41 of the roller guides to adjust the length of the channels as the conveyor chain tension is adjusted. An elongated opening 67 is provided in the lower stabilizer plate 55 to allow vertical movement of the shaft 30. The lower stabilization plate 55 may be provided with a greater number of grooves than are formed in the upper stabilization plate 55 to accomodate shifting of the shaft 30 and sprocket 31.

The preceding description was directed to a conveyor system having stabilizing means at one side thereof. It should be understood that, depending upon the design and use of any particular conveyor to which this invention is applied, stabilizing means may be desirable or necessary on both sides of the conveyor system.

Figure 8:
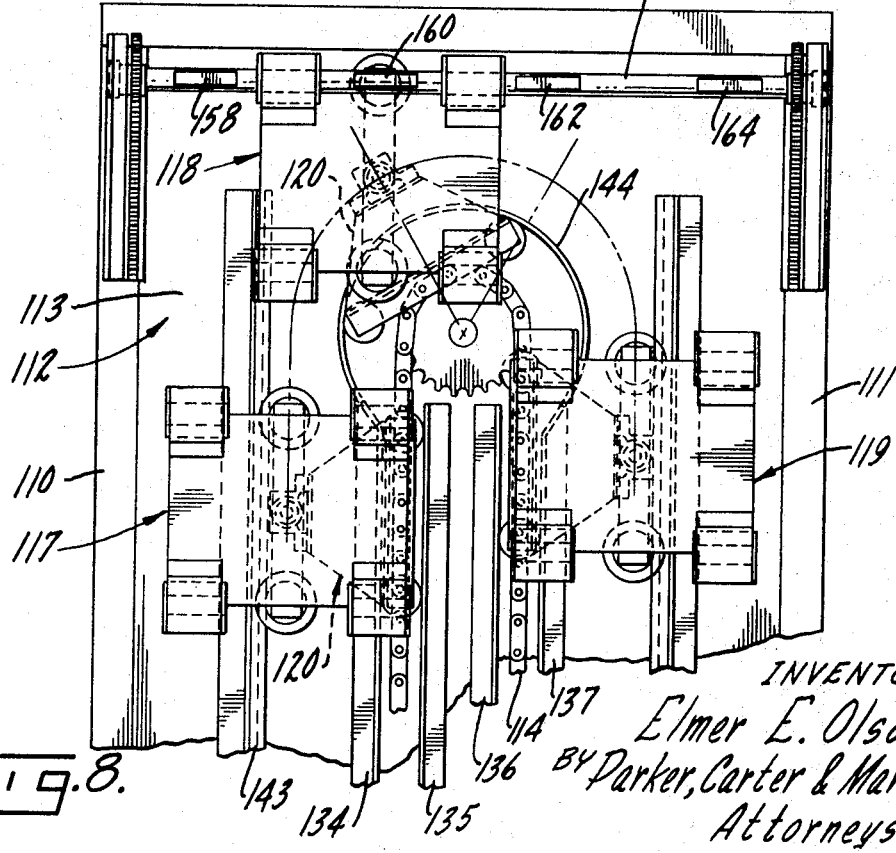
FIG. 8 is a partial vertical side view of the system illustrated in FIG. 7 showing the parts in a subsequent condition.

A modified form of conveyor assembly having a framework, which consists of a pair of uprights 110 and 111, and a back plate or other connecting structure 112, is illustrated in FIG. 7 – 9. In this instance the back plate 112 includes a gauge side 113 which is substantially flush with the facing surfaces of uprights 110 and 111.

A drive chain is indicated at 114, the chain being driven by drive sprocket 115 which receives power from power input shaft 116.

Selected links of the chain are connected to a plurality of carrier bracket assemblies indicated generally at 117, 118 and 119. It will be noted that in this instance the carrier bracket assemblies are connected to the chain links in such relationship to one another that the carrier bracket assemblies virtually abut one another during the rectilinear portion of the path of movement represented by vertical movement in FIGS. 7 and 8. Maximum space utilization is thereby provided, the number of shelves or other carried units being governed largely by the dimensions of the carrier units or shelves themselves. Carrier bracket assembly 117 consists essentially of a supporting assembly, indicated generally at 120, and a base assembly 121, which in this instance, includes a shaft 123 which is fast with a shelf or other supporting structure 122 shown best in FIGS. 9 and 11. The supporting assembly 120 is rotatably secured to the shaft 123 of the base assembly. The primary function of the supporting assembly is to connect the base assembly 121 to the movable driving means, such as the drive chain 114, as will be explained in detail hereinafter.

Supporting assembly 120 consists essentially of a generally trapezoidal shaped housing 125 having a front plate 126, a rear plate 127, and a spacer 128. An upper spacer 129 may be formed from the extension of one of side plates 126 and 127, the upper spacer 129 forming a support base for the bearing assembly indicated generally t 130. The inner edge of housing 125 is connected to a link in the chain 114 by pins 131, 131a, or other suitable fastening means, and, at a second location which is remote from the point of connection to the drive chain, to the base assembly via the bearing 130. The supporting assembly 120 includes a pair of rollers 132,133.

Guide rails which function as guiding and restraining means for the carrier assembly bracket rollers, 132,133 during the rectilinear portion of the path of travel of the assembly are indicated at 134, 135 and 136,137. The rails 134 – 137 are secured to the back plate 112 by any suitable means, such as the flanges 138,139 illustrated best in FIG. 9. A carrier arm radial roller guide, which is an extension of rails 134 and 137 and is continuous with them, is indicated at 144. The inner surface of guide 144 functions as a roll way which provides a two point support for rollers 132,133 during the curvilinear portion of the travel of supporting assembly 120. In effect, guide 144 is a cam which guides rollers 132,133 which are, in effect, cam followers.

Each base assembly 121 includes means for vertically stabilizing the carrier unit as it moves along the rectilinear portion of its path of travel. The vertical stabilization means includes, in this instance, a pair of vertical stabilizer guide wheels 140,141 which are mounted on a strap or bracket 142 which is fast with the shaft 123. The vertical stabilizer guide wheels roll along a vertical stabilizer guide 143 which, in this instance, is formed from a pair of L channels as best illustrated in FIG. 9. The V shaped grooves in the vertical stabilizer guide wheels conform to the external configuration of one of said L shaped channels, again as best illustrated in FIG. 9, and provide a stable two-point support for shaft 123.

Stabilization means for maintaining the base assembly oriented in the same relative position with respect to the horizontal throughout its course of travel along a curvilinear portion of its course of travel is illustrated best in FIGS. 7 and 9 through 11.

The stabilization means includes a horizontal stabilizer shaft 145 which carries, at either end, a stabilizer shaft gear 146,147. The shaft gears are in mesh with stabilizer shaft gear racks 148,149. The racks are carried by braces or other suitable supporting structure 150,151 respectively which are fast with members 152, 153 which in turn are secured to, and extend outwardly from, the frame structure 112. The stabilizer shaft 145 carries bearings 154,155 at each end, the bearings being restrained by suitable guide means such as channels 156,157 which also are fast with extension members 152,153

Shaft 145 includes flat means which, in this instance, comprises four pair of flats, the outwardly facing member of each pair, when the shaft is in the extreme limit condition of FIG. 7, being indicated, respectively, at 158,160, 162 and 164.

The stabilizer means further includes, in this instance, four carrier stabilizing blocks 166, 167, 168 and 169 which are secured to a plate 173 whic is fast with shaft 123. Each carrier stabilizing block 166 – 169 is, in effect, a receptacle for the horizontal stabilizer shaft 145 which, when in engagement with the stabilizer shaft, provides a multi-point support for the carrier unit as said unit moves along the curvilinear portion of its path of travel. In this instance, each receptacle unit 166 – 169 consists of a seat member 170 having a keyhole slot type opening extending therethrough, said opening including a narrow entry way or neck portion 171, and a seat portion 172, said receptacle unit being secured to plate 173 by any suitable means such as the flanges 174, 175 welded thereto. The width of the neck portion 171 of the keyhole slot is just sufficient to receive the flatted sections 158, 160, 162 and 164 of the horizontal stabilizer shaft 145 when the flatted sections of the shaft are vertically aligned with the keyhole slots. The circular seat portions 172 of each receptacle member is of a diameter to snuggly yet slideably receive shaft 145 so that when the shaft seats in a pair of receptacle members in a position in which the flat means of the shaft are out of alignment of the neck portion 171, the shaft will be rotatably locked into the receptacles.

It will be understood that a duplicate stabilization system is provided at the lower end of the conveyor unit which is identical in function and ocnstruction to the illustrated system though reflected in position.

Referring now to the embodiment of FIGS. 12 through 14, it will be noted that in this instance the carrier arms 177, 178, 179 of the supporting assembly are spaced approximately one link apart as best seen in FIG. 12. It will be understood however that is is quite within the scope of the invention to space the carrier arms closely adjacent to one another as illustrated in the embodiment of FIGS. 7 through 11.

In this instance, each carrier arm assembly 177 – 179 is connected, as before, at its inner end to a link is drive chain 114, and, at its outer end, to a base assembly 180 which includes shaft 123. Also, a bracket 181 has been shown fast with the inner end of shaft 123 for the pur- pose of receiving a shelf or other carried unit. Further, the outer end of shaft 123 is fast with a stabilization as- sembly which includes only two seat members 182,183 which are secured, by means of plates 184,185 to the end of shaft 123 by connecting plate 186. The lower end of the assembly carries a roller 187 which may, if desired, make rolling contact with a pair of spaced vertical guide rails, 187a, 187b, equivalent to rails 143 of the embodiment of FIGS. 7 through 11, and/or a cam surface indicated at 188 during the curvilinear position of its path of movement.

In this instance the horizontal stabilizer shaft 189 carries only two pairs of flats 190, 192 which pairs are adapted for engagement with the keyhole slots 171, in the stabilizer blocks.

In the embodiment of FIGS. 15 through 20, the framework includes a back plate 212 having a gauge side 213 which is substantially flush with the facing surfaces of uprights 210 and 211.

A drive chain is indicated at 214, the chain being driven by drive sprocket 215 which receives power from power input shaft 216.

Selected links of the chain are connected to a plurality of carrier bracket assemblies indicated generally at 217, 218, 219 and 220. Carrier bracket assembly 218 consists of a generally trapezoidal plate 218a having an outer right angle flange 221 and an inner roller supporting flange 222. As best seen in FIG. 20, flange 222 has an internal portion which is secured to the inside face of plate 218a, and a down turned portion 223 which carries rollers 224,225. Reinforcing braces are indicated 226,227. Carrier bracket assembly 218 is connected to a link in drive chain 214 by any suitable means such as pins 228,229.

A pair of guide rails which function as guiding and restraining means for the carrier rollers 224, 225, are indicated at 230,231. As clearly shown in FIG. 15, the rails 230,231 guide each carrier bracket assembly along a linear portion of its course of travel as long as rollers 224,225 are in contact therewith. As best seen in FIGS. 15 and 17, rail 231 is inclined at 232 to facilitate entry of a moving carrier bracket as will be described in further detail hereinafter. A similar pair of rails located on the opposite side of, and equidistant from the vertical plane passing through the axis of drive shaft 216 is indicated at 233,234.

Each carrier bracket assembly carries a stabilizer block assembly, the stabilizer block assemblies being indicated at 236, 237, 238 and 239 respectively. In effect, the carrier bracket assemblies function as supporting members for the stabilizer block assemblies, the latter in turn, functioning as base members for carrier units of any desired configuration, such as shelves.

A stabilizer block assembly is illustrated in greater detail in FIGS. 19 and 20. The assembly includes a stabilizer block 240 from which a shelf support pin 241 projects outwardly as viewed in FIG. 20. The stabilizer block 240 may have a layer of rubber or other material having the distortion and resilience characteristics of rubber about its periphery for cushioning shock loads.

The shelf support pin 241 is received in a bearing assembly 242 which consists of upper and lower bearing halves 243,244 which are secured one to another by any suitable means, such as bolts 245. The shelf support pin includes a pair of spacers or separators 246,247 which preclude longitudinal movement of a stabilizer block with respect to the bearing assembly 242. The bearing assembly is connected to flange 221 by bolts 248.

The stabilizer block 240 carries four rollers, two of which, 249 and 250, are located on one face of the stabilizer block but at diagonally opposite corners, with the other two, 251 and 252, being located on the other face at diagonally opposite corners. The rollers 249 – 252 are, in effect, cam followers as will appear hereinafter.

A third set of stationary restraining means is indicated at 253, 254 on one side of drive shaft 216 and a fourth set, which in effect is a continuation of the third set, is indicated at 255,256 on the opposite side of drive shaft 216. As best seen from FIGS. 15 and 18, guide rails 253, 254 are spaced just sufficiently far apart to receive the rollers 249 – 252 of the stabilizer block assembly 236 – 239 in rolling contact. Rails 253 – 256 confine the movement of the stabilizer block assembly to a linear path during that portion of time in which the stabilizer block assemblies are in contact therewith.

From the foregoing description, it will be ovrious that as a caraier bracket assembly moves from the position of assembly 217 in FIG. 15 to the position of assembly 218 in FIG. 15, the stabilizer block assembly, and whatever may be supported from the shelf support pin 241, moves along a linear path of travel, and is restrained from tipping of wobbling by rails 253, 254.

A motion transfer system for conveying the stabilizer block assemblies along a curvilinear portion of their course of travel, indicated at C, is illustrated in FIGS. 15 through 18 and in FIGS. 15 and 18 particularly.

The motion transfer system includes a pair of stabilizer block pockets indicated generally at 257 and 257a. Left stabilizer block pocket 257 comprises a generally inverted "L" shape member 258 which has an inwardly projecting portion 259 or leg and a downwardly projecting portion 260. An abutment plate 261 is welded to the inside surface of portion 260. Plate 261 and leg 259 thereby form a right angled pocket for the reception of stabilizer block 240. Pocket 257 is pivotally connected as at 262 to a transfer arm 263, which is illustrated best in FIGS. 16 and 18. The lower end of transfer arm 263 is integral with a gear 264 which is mounted on a shaft projecting through support plate 212. A cam 265 having a cam surface 266 is integrally connected to transfer arm 263.

Leg 259 of stabilizer block pocket 257 is welded or otherwise suitably secured to a horizontal slide rod sleeve 267. Sleeve 267 slides back and forth in a horizontal direction along horizontal slide rod 268, the ends of which are received in sockets 269,270 in vertical slide rod sleeves 271, 272, respectively. The vertical slide rod sleeves move simultaneously up and down in vertical directions along vertical slide rods 273, 274, which are supported from brackets 275, 276 shown best in FIGS. 15 and 18.

Right stabilizer block pocket 257a is substantially identical to left stabilizer block pocket 257, and accordingly will not be described in detail. For purposes of reference, parts in the left stabilizer block pocket which correspond to a similar or identical part in the right stabilizer block pocket are identified by the same reference number and the postscript "a." It should be noted that the lower end of transfer arm 263a is fast with a gear 264a which meshes with gear 264. It will, therefore, be obvious that as one or the other of the stabilizer block pocket assemblies is rotated, the movement generated thereby will be reflected in the opposite stabilizer block pocket assembly by virtue of the meshing gears.

From FIG. 18 it will be noted that transfer arm 263 and 263a are spaced eqidistantly from the back plate 212. However, left and right stabilizer block pockets 257 and 257a are offset with respect to one another about a line passing through the vertical axis of the vertical slide rods 273 and 274. Referring particularly to FIG. 18, it will be noted that upper leg 259 of left stabilizer block pocket 257 is located on the outer side of axis 277 by virtue of spacer 278, whereas upper leg 259a of the right stabilizer block pocket is located on the opposite side of axis 277 by virtue of a shorter spacer 279. This is necessary to avoid interference when the stabilizer block pockets 257 and 257a approach and overlap one another as illustrated in FIG. 17.

It will be further noted that by virtue of the difference in length between spacer 278 and 279, cams 265 and 265a will overlap without interference as indicated in FIG. 17. As can be best visualized from FIG. 18, cam 265 is aligned with the two rollers 249, 250 on the outer side of stabilizer block 240, and cam 265a is aligned with the two rollers 251, 252 on the inner side of stabilizer block 240.

The use and operation of the invention are as follows:

In explaining the operation of the embodiment of FIGS. 1 through 6, assume that the operator of the conveyor assembly has placed a call for a specific carrier unit which requires the carrier unit to travel about the idler sprocket 28 in a clockwise direction as viewed in FIG. 1. It will be understood that in the operation of the type of machine illustrated in U.S. Pat. No. 3,340,995 the carrier unit will transverse the shortest distance to the presentation area from wherever it happens to be at the moment the call is placed.

FIG. 1 shows one carrier support plate 45 starting its arcuate portion of travel with another bracket support plate 45 moving downwardly into the linear portion of its orbital path of travel. As the carrier bracket plate 45 enters its arcuate path of travel, the carrier bracket sprockets 49 move out of contact with the stationary roller chains 54 and engage the grooves 56 of the stabilizer plate 55. At the same itme, the rollers 37 of the carrier support arms 34 move out of the channels 41 and into the semi-circular guide members 42. It should be noted that the reaction forces on the carrier bracket sprockets 49 act at right angles to the reaction forces on the carrier support arm rollers 37 during both linear and arcuate movement of the carrier bracket plates 45. As the carrier bracket plates 45 traverse the conveyor drive sprocket 28, the carrier arms 34 and sprocket wheels 49 maintain the plate in a stabilized horizontal position. The increased length of the slots 56 near the top of the upper stahilizer plate 55 and the bottom of the lower stabilizer plate 55 permit the sprockets to slide horizontally while maintaining stability of the carrier bracket plate. When the carrier bracket plate completes its arcuate path of travel across a stabilizer plate 55, the sprockets will move into engagement with the stationary roller chains 54 in the manner shown in the right hand side of FIG. 1.

It is apparent from FIG. 1 that the carriers or shelves which may be attached to the carrier bracket plate 45 can be loaded from the ends of the conveyor assembly (i.e., the direction in which the viewer is looking at FIG. 1), because the conveyor drive chain 27 and sprockets 28 and 31 are located inwardly of the conveyor bracket plates along the linear portions of the conveyor.

The second embodiment of the invention, illustrated in FIGS. 7 through 11, operates in the following manner. In the position illustrated in FIG. 7, carrier bracket assembly 118 is shown at the end of its rectilinear path of movement, and at the beginning of the curvilinear portion of its path of movement. As the stabilizer assembly travelled to this position, vertical stabilizer guide wheels 140 and 141 travelled along the vertical stabilizer guide assembly 143. At the same time, the rollers 132, 133 of the supporting assembly 120 rolled in the slot formed between the inside carrier arm roller guide 135, and the outside carrier arm roller guide 134.

Each carrier bracket assembly is maintained in a vertical position as it moves from the position occupied by carrier bracket assembly 118 to the position occupied by carrier bracket assembly 118 of FIG. 7 because the vertical stabilizer guide wheels are in contact with the vertical stabilizer guides 143 during this period, and the plate 173 is rigid with respect to the spacer bar 142 on which the rollers 140 and 141 are mounted. By the same token, supporting assembly 120 is maintained in the illustrated position even though it is free to rotate about shaft 123 because one roller, in this instance a lower roller 132, is restrained by the rails 134, 135 until the position of carrier bracket assembly 118 in FIG. 7 is reached.

When carrier 118 reaches its illustrated FIG. 7 position, horizontal stabilizer shaft 145 will be received in receptacle members 166 and 167. It will be noted that flat means 158, 160 on the shaft 145 are vertically aligned with the neck portion 171 of each receptacle thereby permitting entry of the horizontal stabilizer shaft into the seat portion 172 of each receptacle.

As drive chain 114 continues its movement, supporting assembly 120 begins to rotate about shaft 123 because the link to which the supporting assembly is connected by pins 131, 132 begins to traverse a circular path as contrasted to the rectilinear path it has followed up to the position of FIG. 7. The movement of the link to which the supporting assembly 120 is attached has both a horizontal and a vertical component of movement as will be obvious to one skilled in the art. This movement is separated into a vertical component by the upwardly directed bearing pressure exerted by seats 172 on shaft 145 which causes the stabilizer shaft 145 to begin to move in an upward direction because of the pivotal connection of the supporting assembly 120 to shaft 123. At the same time, the horizontal component of movement of the link results in the rightward movement of carrier bracket assembly 118 because the seats 172 in each of the receptacle members are of a size to receive horizontal shaft 145 in sliding, rotatable relationship and the vertical distance between the axis of shaft 123 and the points of connection 131, 132 is fixed.

It will be further noted that as soon as the right edge of each receptacle seat 172 moves past the end of each flat means the stabilizer shaft is locked to the base assembly because the width of necked down portion 171 of the keyhole slot in the receptacle is less than the diameter of the shaft.

When the link of drive chain 114 to which the supporting assembly 120 is connected moves to the 12 o'clock position, the maximum vertical travel of horizontal stabilizer shaft 145 is reached. FIG. 8 illustrates the supporting assembly 120 in approximately the 11 o'clock position for purposes of clarity.

Since the stabilizer shaft 145 is rotated by a rack and pinion system, it will be understood that while the shaft is recirpocating in a vertical direction it is also rotating, and it is within the ability of one skilled in the art to so space the flat means 158, 160, 162, 164 that at no time will adjacent flat means be aligned with the keyhole slots in the receptacle means carried by the base assembly until the end of the curvilinear portion of the path of travel.

As the carrier unit moves from the 12 o'clock position to approximately the 3 o'clock position, the stabilizer shaft is moved downwardly back to the position of FIG. 7. When the 3 o'clock position is reached, flats 162, 164 of the shaft 145 are aligned with the neck portion 171 of each receptacle member, and, as drive chain 114 continues to move, the carrier bracket assembly drops out of contact with the shaft 145.

It will be noted that all during the period of time in which the supporting assembly 120 was rotating with respect to the base assembly 121, the supporting assembly was further steadied by the rolling engagement between rollers 132, 133 and the extension 144 of the outer carrier arm roller guides 134, 137. This feature provides additional stability to the supporting arm assembly and reduces stress and strain on the pins connecting the supporting assembly 120 to the chain link 114.

Much the same mode of operation occurs in the embodiment of FIGS. 12, 13 and 14. In this instance, however, the engagement of carrier arm roller 132 with the inner and outer carrier arm roller guides 135, 134 and the securement of the supporting assembly 178 to shaft 123 are relied upon to maintain the carrier unit 180 vertically aligned until the link to which the supporting assembly 178 is attached reaches a position at which curvilinear movement begins. That is, during that period of time in which carrier arm roller 133 is out of contact with the roller guides 134, 135, there is no auxiliary stabilizing means equivalent to the vertical stabilizer guides 143 of the embodiment of FIGS. 7 through 11. In all other respects, the mode of operation is substantially identical to that of the earlier described embodiment, and accordingly a detailed description of operation is not considered necessary.

In the operation of the embodiment of FIGS. 15 – 20, assume a carrier bracket assembly is at the position of assembly 218 in FIG. 15 and it is desired that the assembly, and thereby the shelf 280 that it carries, must travel up and around drive sprocket 215 in a clockwise direction in response to a "call."

In the position illustrated in FIG. 15, left stabilizer block pocket 257 is at its extreme lower position of movement. In this position, abutment plate 261 forms in effect a continuation of the rolling surface of rail 253. By the same token, right stabilizer block pocket 257a forms a temporary extension of rail 256. It will be understood, of course, that carrier bracket assembly 218 moved along a linear path of travel as it moved from the position of assembly 217 to assembly 218 in FIG. 15, assuming it rested in the position of assembly 217 at the time the "call" was placed.

In the first increment of movement of the system (commencing from the FIG. 15 position) roller 251 of carrier bracket assembly 218 rolls on to abutment plate 261. At the same time, of course, the lower right roller 250a in stabilizer block assembly 238 rolls from abutment plate 261a on to rail 256.

Left stabilizer block pocket 257 remains in the FIG. 15 position until stabilizer block assembly 237 has moved upward to a position in which the upper and left surfaces of stabilizer block 240 contact upper leg 259 and abutment plate 261 respectively. It will be understood that during this increment of movement, rotation of shelf support pin 241 was precluded because at least two, and for most of the time, three of the four rollers on stabilizer block 240 were in contact with rail 254 and either rail 253 or abutment plate 261.

As soon as contact is made between the upper surface of stabilizer block 240 and leg 259, the left stabilizer block pocket 257 begins to move upwardly and inwardly. It will be understood that since transfer arm 263 is pivoting about a fixed axis 281 (see FIG. 18) any movement in an upward direction will result in an additional component of movement in an inward direction (that is, toward vertical axis 282) since the distance between pin 262 and axis 281 is fixed at all times.

As stabilizer block pocket 257 moves upward, vertical rod sleeve 271 is pushed upward and horizontal rod sleeve 267 is moved inwardly or to the right as viewed in FIG. 15.

It will be understood that since right stabilizer block pocket 257a is connected to left stabilizer block pocket 257 by virtue of meshing gears 264 and 264a, there will be an equal but opposite (that is, a counterclockwise) movement or right stabilizer block pocket 257a occurring during movement of the left stabilizer block pocket, 257.

As the transfer arm 263, and thereby the stabilizer block 240, swings upward from the 9 o'clock position toward the 12 o'clock position, roller 250 contacts the left end of cam surface 266 on cam 265 and rolls on the cam surface, as best illustrated in FIG. 16, until the limit of contact shown in FIG. 17 is reached.

As soon as stabilizer block assembly 237 reaches the position of FIG. 17, the upper and right surfaces of the stabilizer block 240 make contact with leg 259a and abutment plate 261a respectively of the right stabilizer block pocket 257a. At the same time cam roller 250 breaks cam with th surfaces 266, and cam roller 251 makes initial contact with the left end of cam surface 266a.

Continued movement of the carrier bracket assembly 218 and thereby the stabilizer block assembly 237 now acts on the right stabilizer block pocket 257a. This causes gears 264 and 264a to reverse their direction of rotation, and accordingly the transfer arms 263, 263a swing back down to the 9 o'clock and 3 o'clock positions, respectively.

It will be understood that as the transfer arms 263, 263a swing to the 9 o'clock and 3 o'clock positions, the horizontal slide rod sleeves 267, 267a will simultaneously move outwardly toward vertical slide rods 273, 274. Vertical slide rod sleeves 271, 272 will simultaneously slide downwardly from their upper limit position of FIG. 17 to their lower limit position of FIG. 15.

When carrier assembly bracket 218 has reached the position of carrier assembly bracket 219 of FIG. 15, the curvilinear motion transfer function has ended and the motion transfer system remains inactive until the next following carrier bracket assembly makes contact with left stabilizer block pocket 257, assuming continued clockwise rotation of sprocket 250.

It will be obvious from the foregoing description that the system functions identically whether sprocket 215 rotates in a clockwise or counterclockwise direction.

It will be understood that although several embodiments of the invention have been illustrated and described, the invention is applicable with modifications obvious to those skilled in the art to other environments. Accordingly, it is intended that the invention be limited not by the scope of the foregoing description but solely by the scope of the hereinafter appended claims when interpreted in light of the specification and the pertinent prior art.

I claim:

1. A stabilization system for a conveyor of the type in which carriers supported by a flexible drive means traverse a closed, orbital path, said stabilizing system including:

carrier support means connected to each of said carriers and said flexible drive means, first stabilizing means associated with said carrier support means, each of said carriers being pivotally connected to a carrier support means which is cantileverly attached to said flexible drive means, and second stabilizing means associated with said carriers, said second stabilizing means including sprockets associated with said carriers and sprocket engaging means mounted along the path of travel of said sprockets during movement of said carriers about said closed, orbital path, said stabilizing means cooperating with said carriers and said carrier support means to maintain said carriers in a predetermined attitude relative to the horizontal during traversing of said closed, orbital path.

2. A stabilization system of a conveyor of the type in which carriers supported by a flexible drive means traverse a closed, orbital path, said stabilizing system including:

carrier support means connected to each of said carriers and said flexible drive means, first stabilizing means associated with said carrier support means, and second continuous operable stabilizing means associated with each of said carriers, said stabilizing means cooperating with said carriers and said carrier support means to maintain said carriers in a pre-determined attitude relative to the horizontal during traversing of said closed, orbital path, said second continuously operable stabilizing means being further disposed in the same relative position with respect to its associated carrier at all positions throughout said closed, orbital path.

3. The stabilization system of claim 2 further characterized in that said closed, orbital path includes linear and curvilinear portions and said first and second stabilizing means are provided for said linear and curvilinear portions.

4. The stabilization system of claim 2 further characterized in that said first stabilizing means includes a multi-point support for each carrier support means during linear and curvilinear movement in said closed orbital path.

5. The stabilization system of claim 2 further characterized in that said second stabilizing means includes a multi-point support for each carrier during linear and curvilinear movement in said closed, orbital path.

6. The stabilization system of claim 2 further characterized in that said first stabilizing means includes rollers associated with said carrier support means and roller guide means engaging said rollers during movement of said carriers about said closed, orbital path.

7. The stabilization system of claim 6 further characterized in that said roller guide means include a pair of opposed guides positioned along the linear portion of movement of said carriers and a pair of arcuate opposed guides positioned along the curvilinear portion of movement of said carriers.

8. The stabilization system of claim 6 further characterized in that the axes of said rollers extend at right angles to the axes of said carrier sprockets.

9. The stabilization system of claim 2 further characterized in that said sprocket engaging means includes a chain positioned along the linear portion of movement of said carriers and a plurality of spaced grooves positioned along the curvilinear portion of movement of said carriers.

10. The stabilization system of claim 9 further characterized in that said grooves and chains are aligned and said grooves form an arcuate path for said carrier sprockets.

11. A motion transfer system for moving a base assembly adapted for connection to a carrier unit along a curvilinear path while maintaining said base assembly oriented in the same relative position with respect to the horizontal throughout its course of travel, said system including, in combination, with a frame structure,
   a base assembly,
   a supporting assembly,
   said supporting assembly being connected, at a first location, to movable driving means associated with the frame structure, and, at a second location which is remote from said first location, to the base assembly by pivot means,
   stabilizer means for maintaining the base assembly oriented in the same relative position with respect to the horizontal throughout its course of travel, along a curvilinear portion of its path of movement, said stabilizer means including a first means which is mounted for movement along a curvilienar path with said base assembly and a second member which is mounted for movement along a rectilinear path,
   one of said first and second members being mounted for simultaneous movement along two axes,
   said first and second members providing a multi-point support for the base assembly during its travel along the curvilinear path, and,
   means for maintaining said first and second members connected to one another as they move relative to one another along the curvilinear path.

12. The motion transfer system of claim 11 further characterized in that
   said connection maintenance means includes a receptacle member associated with one of said first and second members capable of receiving the other of said first and second members in sliding, axially fixed relationship, and
   means for engaging and disengaging said receptacle member with said other of said first and second members.

13. The motion transfer system of claim 12 further characterized
   firstly, in that said second member is elongated and has a circular cross section,
   secondly, in that said receptacle means includes a seat capable of receiving said second member in close fitting relationship, said seat conforming to more than 180° of the circumference of the elongated member, and
   thirdly, in that the connection maintenance means includes flat means formed on the second member and slide way means on the receptacle means opening into the seat of the size sufficient to receive the flat means on the second member,
   said flat means on the second member and the slideway means on the receptacle means being disposed to engage one another at that point at which commencement of the curvilienar portion of the path of travel of the base assembly occurs.

14. The motion transfer system of claim 13 further characterized
   firstly, in that the receptacle means includes a plurality of seats capable of receiving said second member, and
   secondly, in that the connection maintenance means includes a plurality of flat means formed on the second member, at least one flat means for each of the plurality of seats on the receptacle means.

15. The motion transfer system of claim 11 characterized in that
   the movable driving means is a drive chai powered from a suitable source, and
   the second member moves in a plane which is parallel to the plane in which the drive chain operates,
   said second member being located between the drive chain and the point of connection of the base assembly to a carrier unit assembly.

16. The motion transfer system of claim 11 characterized in that
   the movable driving means is a drive chain powered from suitable source, and
   the second member moves in a plane which is parallel to the plane in which the drive chain operates,
   said drive chain being located between the second member and the point of connection of the base assembly to a carrier unit.

17. The motion transfer system of claim 11 further including
   guiding and restraining means for the supporting assembly which provides support for said supporting assembly as it traverses said curvilinear path,
   said guiding and restraining means comprising cam means and cam follower means associated with the supporting assembly and frame structure, which, when in engagement during the curvilinear path of movement, function to steady the supporting assembly.

18. The motion transfer system of claim 17 further characterized in that said cam means and cam follower means provide support for said supporting assembly at a plurality of locations.

19. The motion transfer system of claims 17 further characterized in that
said cam means is a contoured surface carried by the frame structure over which the cam follower means travels.

20. The motion transfer system of claim 11 further including
stabilizing means associated with the base assembly for maintaining the desired orientation of said base assembly during the rectilinear portion of the path of travel of said base assembly.

21. The motion transfer system of claim 20 further characterized in that said stabilizing means includes
a guide surface fixed to the frame structure, and
guide surface follower means carried by, and fast with, the base assembly,
said guide surface and guide surface follower means being arranged to maintain the base assembly, and thereby a carrier unit carried thereby, oriented in the same relative position with respect to the horizontal throughout its course of travel along a rectilinear path.

22. A motion transfer system for moving a base member along a curvilinear path while maintaining said base member oriented in the same relative position with respect to the horizontal throughout its course of travel, said system including, in combination,
a base member, and
a supporting member,
said supporting member being connected at a first location to movable driving means, and, at a second location which is remote from said first location, to the base member by pivot means, and
a pair of stabilizer assemblies, each assembly including a first member which is mounted for movement along a curvilinear path in fixed contact with said base member, and a second member which is mounted for movement along a curvilinear path in moving contact with said base member,
each of said first members being mounted for simultaneous movement along two axes whereby said first members are always oriented in the same relative position with respect to the horizontal,
each pair of said first and second members cooperably providing at least a three point support for the base member during its travel along the curvilinear path,
said stabilizer assemblies having movement coordinating means for moving said stabilizer assemblies from (a) a first position in which one of said stabilizer assemblies is in contact with a given base member, to (b) a second position in which contact of said base member is transferred from said one stabilizer assembly to the other stabilizer assembly, and then (c) back to said first position, at which time the base member is in contact with said other stabilizer assembly, but not said one stabilizer assembly.

23. The motion transfer system of claim 22 further characterized in that
firstly, said movable drive means includes a chain and drive means therefore, and
secondly, in that the stabilizer assembly movement coordinating means is a pair of meshing gears which rotate about fixed axes, one for each stabilizer assembly,
each gear being integrally mounted on a transfer rod,
each transfer rod carrying a first and second member,
said stabilizer assemblies being rotated by movement of the base member.

24. The motion transfer system of claim 23 further characterized in that each transfer rod is connected to
an H linkage which permits simultaneous movement of each of the first members along a horizontal and a vertical axis.

25. The motion transfer system of claim 24 further characterized
firstly, in that the first member is mounted on the H linkage and remains in fixed, abutting contact with the base member during its period of contact, and
secondly, in that the second member is mounted on the transfer rod.

26. The motion transfer system of claim 25 further characterized in that
the second member is a fixed cam surface which is cooperable with
a cam follower carried by the base member.

27. The motion transfer system of claim 26 further characterized in that
the cam follower is a roller.

* * * * *